(No Model.)
J. M. CAMPBELL.
FRUIT DRIER.
No. 283,202. Patented Aug. 14, 1883.
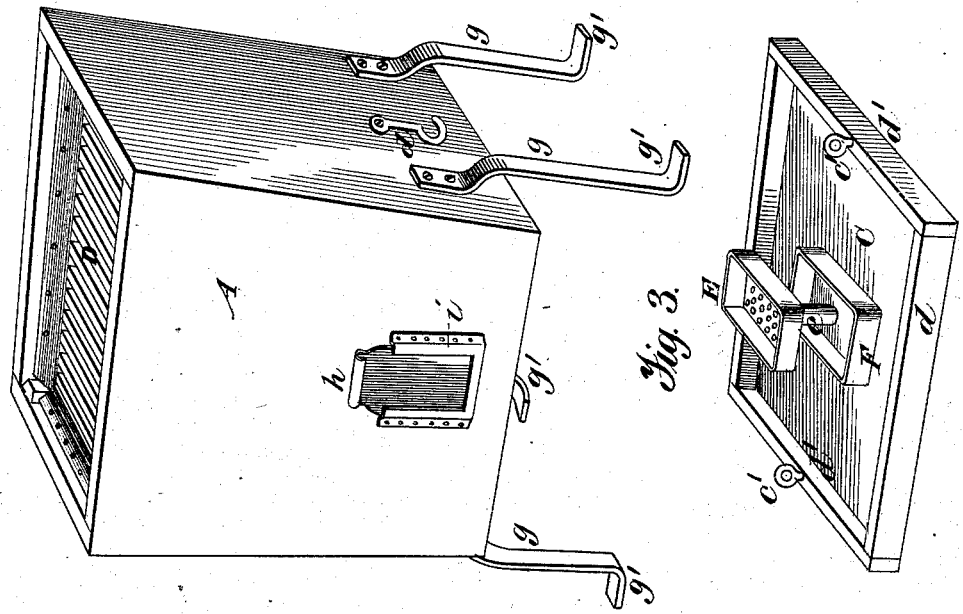
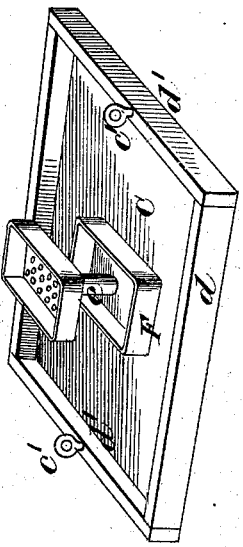
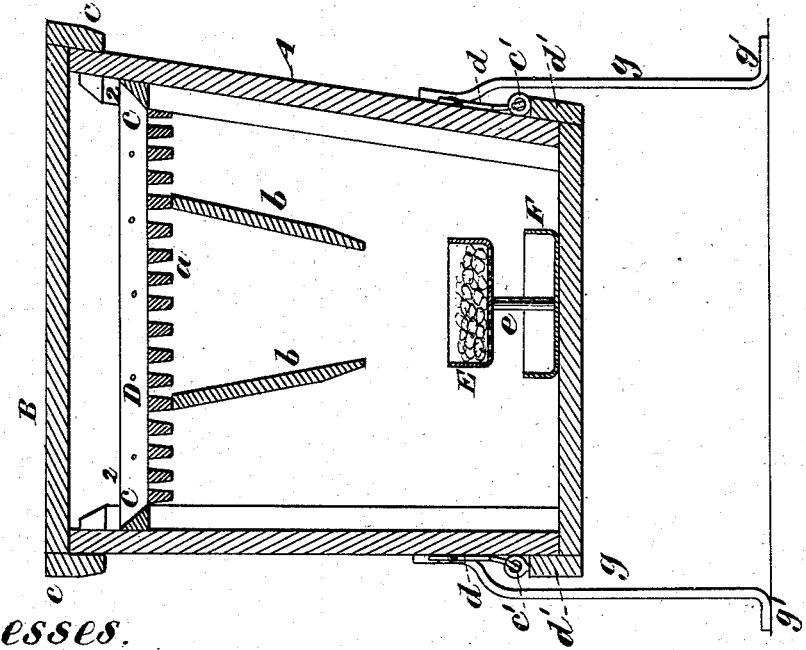
Witnesses.
A. Ruppert.
D. P. Holloway
Inventor
James M. Campbell.
by H. J. England, Atty.

UNITED STATES PATENT OFFICE.

JAMES M. CAMPBELL, OF BRUSHLAND, NEW YORK.

FRUIT-DRIER.

SPECIFICATION forming part of Letters Patent No. 283,202, dated August 14, 1883.

Application filed June 11, 1883. (No model.)

*To all whom it may concern:*

Be it known that I, JAMES M. CAMPBELL, a citizen of the United States, residing at Brushland, in the county of Delaware and State of New York, have invented certain new and useful Improvements in Fruit-Driers, of which the following is a specification, reference being had therein to the accompanying drawings.

My invention relates to certain new and useful improvements in fruit-driers; and it consists in forming a proper receptacle for the reception of the fruit, adapted to be placed over or on top of an ordinary stove in such a manner that the rising heat from the same will pass up into said receptacle and through the fruit, and after the fruit is thus dried to a certain extent, by an additional device and material the fruit is bleached, giving it a lighter color and a clean, bright appearance.

The object of my invention is to produce a fruit-drier that will economically dry fruit on the top of an ordinary stove, that may at the same time be in use for other purposes, that will by its construction retain the essential parts of said fruit and deliver the same clean and bright, making said fruit more desirable for use or market than would otherwise be the case were the fruit dried in the open air or hung on strings around a stove in a dusty room. I attain these objects by means of the peculiar construction and arrangement of the different parts of my device, which will be more fully pointed out and described in the specification and claims.

Heretofore fruit of various kinds has been dried by the rays of the sun in the open air, and by kilns constructed of stone and brick, with devices for heating the same; also, fruit-driers have been constructed requiring fire-boxes and the consumption of a great amount of fuel, which proves expensive and does not meet the wants of a large share of fruit-growers.

My invention seeks to obviate the foregoing difficulties and expense by producing a cheap, simple, and durable device that can be used in any household.

Reference being had to the drawings accompanying this application and forming part of the same, Figure 1 is a vertical sectional view of my invention, showing section of tray, inclined partitions, and bleaching-box. Fig. 2 is a perspective view of the same with cover removed. Fig. 3 is a detail view of the bottom with bleaching-box in center of the same.

Similar letters refer to similar parts throughout the drawings.

Referring to the drawings, A represents an angular box of any desirable size, having its sides and front inwardly inclined to bring the bottom within the outer edges of the top of an ordinary stove, as shown in Fig. 2. By this construction a larger surface is secured at the top of the box for drying purposes than would be if the box were made square with perpendicular sides. Furthermore, the heated air, by expansion, permeates the whole upper surface between the slats and fruit and creates a strong upward draft, and its rear face straight or at right angles with its flat top B, said top being formed with downwardly-projecting flanges $c$, adapted to fit over the edges and sides of the box A to form a tight cover when desired to retain the heat or the fumes of the bleaching-powder. The under side of box A is provided with a similar cover, C, formed with upwardly-projecting flanges $d'$, adapted to fit tightly against the lower edges of said box. On the inner face of said cover C, and near its center, is secured a metal fire-box, E, mounted on a standard, $e$, above an ash-box, F. The purpose of this construction, as shown in Fig. 1, is to bleach the fruit by placing coals of fire in the fire-box E, upon which sulphur is placed through an opening in the side of the box A, formed for that purpose. Eyebolts $c'$ are secured in the upper edges of flanges $d'$, adapted to engage with hooks $d$, loosely secured on the sides of the box A, by which the cover or bottom C is held in place against the lower ends of box A, said box being supported on legs or standards $g$, having outwardly-turned feet $g'$, as shown in Fig. 2. A tray, D, composed of cross-slats $a$, is secured within box A, near its upper end, formed for the reception of fruit to be dried. Said slats are secured to beveled strips $c^2$, that are nailed or screwed to the inner sides of box A. Secured to the sides of box A, and projecting downward from the slats $a$, are two inclined partition-walls, $b$, used for deflecting the currents of heated air and the fumes of the bleaching-powder. An opening in the side of box A is provided with a sliding gate, $h$, adapted to work in guides $i$, by means of which said opening may be opened or closed, as desired, and through which sulphur is placed on the live coals in fire-box E by means of an iron spoon or ladle, when desired. The slide $h$ is raised to admit air when required to keep the coals alive in the fire-box.

The operation of the device is as follows: The drier or box A is placed above an ordinary cooking-stove, supported on said stove by its legs $g$. The cover B and the bottom C are removed. Fruit properly prepared is placed on the tray D. Heat from the stove, passing up through the box A and around and between the fruit, thoroughly dries the same. After drying a sufficient length of time, the cover B and bottom C are replaced, coals of fire are placed within the fire-box E, and sulphur is placed on top of the coals through the opening covered by slide $h$, when, by the action of the sulphur, the fruit is bleached and rendered more desirable and salable.

Having thus described my invention, what I claim, and desire to secure by Letters Patent, is—

1. A fruit-drier consisting of an angular box having a removable cover, and a removable bottom supported by hooks and eyebolts, a fire-box supported above an ash-box near the center on the inner face of said bottom, a slide adapted to cover an opening in the front of said drier, a pair of inclined partition-walls within the drier, and a tray formed of a series of slats with spaces between each, and the whole supported on four curved metal standards, substantially as shown and specified.

2. A fruit-drier consisting of an angular box having three tapering sides, a plain back formed at right angles with the flat top of said box, a bottom adapted to be clamped to the lower edge of said box, said bottom having a fire-box on its inner face, a slatted tray arranged within said box, the whole surmounted on metal standards adapted to rest on the upper face of an ordinary cooking-stove, substantially as shown and specified.

3. In a fruit-drier, a flanged bottom, C, having eyebolts $c'$, and a fire-box, E, mounted on standard $e$ above an ash-box, F, substantially as shown and specified.

4. In a fruit-drier, the combination of the angular box A, the slatted tray D, the inclined partitions $b$, the curved legs $g$, and the slide $h$, with the flat top B, the flanged bottom C, having eyebolts $c'$, the fire-box E, standard $e$, and the ash-box F, all arranged and operated substantially as shown and specified.

In testimony whereof I affix my signature in presence of two witnesses.

JAMES M. CAMPBELL.

Witnesses:
WALTER H. GRISWOLD,
G. E. MARVINE.